United States Patent [19]
Wuertz

[11] Patent Number: 5,393,930
[45] Date of Patent: Feb. 28, 1995

[54] SELF-ANCHORING POKE-THROUGH WIRING DEVICE

[75] Inventor: Emil S. Wuertz, Madison, Conn.

[73] Assignee: Hubbell Incorporated, Orange, Conn.

[21] Appl. No.: 31,349

[22] Filed: Mar. 15, 1993

[51] Int. Cl.⁶ .............................................. H02G 3/22
[52] U.S. Cl. ....................................... 174/48; 52/220.8
[58] Field of Search ........................... 174/48; 52/220.8

[56] References Cited

U.S. PATENT DOCUMENTS

| | | | |
|---|---|---|---|
| 4,272,643 | 6/1981 | Carroll et al. | 174/48 |
| 4,323,724 | 4/1982 | Shine | 174/48 |
| 4,496,790 | 1/1985 | Spencer | 174/48 |
| 4,573,297 | 3/1986 | Benscoter | 174/48 X |
| 4,770,643 | 9/1988 | Castellani et al. | 174/48 X |
| 5,032,690 | 7/1991 | Bloom | 174/48 |

FOREIGN PATENT DOCUMENTS 209915  8/1989  Japan ..................................... 174/48

*Primary Examiner*—Leo P. Picard
*Assistant Examiner*—David Tone
*Attorney, Agent, or Firm*—Jerry M. Presson; Leopold Presser

[57] ABSTRACT

A self-anchoring flush-type poke-through electrical wiring fitting which is adapted to be positioned in a floor aperture which is formed in a concrete building floor, for enabling the conducting of electrical power and telecommunication signals between the work spaces of multi-storied buildings. A retainer clip is engaged between a floor cup structure and disc-shaped fire barrier inhibiting displacement of the retainer clip. The retainer clip is constructed of a cold-worked stainless steel material, preferably such as type 302 or 304 annealed stainless steel possessing a minimal degree of resilience.

11 Claims, 3 Drawing Sheets

SELF-ANCHORING POKE-THROUGH WIRING DEVICE

BACKGROUND OF THE INVENTION

1. Field of the Invention

The present invention relates to a poke-through wiring device and, more particularly, pertains to a self-anchoring flush-type poke-through electrical wiring fitting which is adapted to be positioned in a floor aperture which is formed in a concrete building floor, for enabling the conducting of electrical power and telecommunication signals between the work spaces of multi-storied buildings.

Basically, during the erection of various types of building structures; for instance, especially such as modern multi-storied office buildings possessing concrete floors, it is frequently necessary, and also commonly accepted building practice, to normally provide fire-rated poke-through fittings and devices for conducting insulated conductors, wires, cables and the like for the transmission of electrical power and telecommunication signals through suitable holes or apertures which are formed in the concrete building floors. Hereby, this enables electrical power and other kinds of signals, such as telecommunication signals, to be readily transmitted from a suitable source; for instance, from a junction box located at or proximate one face, ordinarily the lower surface of the concrete floor through the intermediary of the poke-through fitting through the aperture in the concrete building floor to a suitable outlet or service head which is located at the opposite, generally upper face of the floor. Thus, in order to accomplish the foregoing purpose; essentially, the positioning in a floor aperture of a poke-through wiring device or fitting of the type described herein, the service head, under various circumstances, is intended to incorporate a carpet flange which is to be mounted flush on the upper surface of the floor or on a carpet which covers the floor; and in which the device may be equipped with suitable gripping structure enabling the poke-through wiring device or fitting to be inserted from above into the floor aperture formed in a concrete floor so as to resultingly anchor itself in a predetermined orientation in the aperture, inhibiting withdrawal of the fitting therefrom, while suspending a junction box below the floor aperture, as may be required.

Heretofore, under various circumstances, the poke-through wiring fitting, which generally incorporates fire barrier structure, usually intumescent-material discs, adapted to be located within the confines of the floor aperture, at the end thereof opposite the floor surface mounting the service head, incorporated a suitable toggle arrangement proximate the junction box for clamping engagement with the lower surface of the concrete floor, so as to enable the fitting to be anchored in the floor aperture. Such a toggle arrangement generally included plate members having axially oriented screw members threadingly extending therethrough oriented coextensive with the axial alignment of the fitting, and which contact against the lower surface of the concrete floor structure so as to draw the poke-through wiring fitting downwardly into a flush-mounted engagement at the upper end thereof with the opposite surface of the floor.

Various types and designs of floor fittings of this kind eliminate the need for such toggle arrangements by providing for clip-like anchoring or gripping structure as a component of the poke-through fitting, which structure normally biasingly engages the circumferential wall surface of the floor aperture in order to firmly anchor and secure against withdrawal of the poke-through fitting in predetermined axially and/or radially adjusted positions within the floor aperture. In essence, as a consequence of eliminating the toggle arrangement, this imparts the poke-through wiring device or fitting with the capability of being introduced into the floor aperture from above and enabling it to be anchored in a predetermined oriented position within the floor aperture while eliminating the need for the services of cooperating electricians having to work in tandem on the floors above and below the floor aperture in order to obtain an appropriately oriented installation of the poke-through fitting; in effect, permitting the work to be carried out by a single unaided electrician or installer, thereby significantly reducing attendant labor costs.

Although numerous type of structures have been heretofore proposed and are currently in widespread use in this technology for the purpose of anchoring poke-through wiring devices or fittings in concrete floor apertures, not all of these structures have been able to completely satisfactorily meet the requirements in being able to not only anchor the poke-through fitting in the floor aperture through the intermediary of a novel clip structure, but also impart a capability to the upper end portion of the fitting of mounting a detachable installation plate which is to be employed as a template for the cutting and laying of floor carpeting about the floor aperture and to thereafter enable the replacement of the installation plate with a suitable carpet flange and receptacle assembly, and by application of foot pressure downwardly to the carpet flange, push the poke-through fitting downwardly into the floor aperture into its final flush-mounted anchored position.

2. Discussion of the Prior Art

At this time, various types of anchoring devices are known to provide for the self-anchoring of poke-through wiring fittings in floor apertures of multi-storied buildings, and all of which effectively eliminate the need for so-called toggle assemblies for clamping the poke-through wiring devices or fittings in position generally through the employment of spring clips which engage the wall structure of the floor apertures.

In order to provide for the self-anchoring of the poke-through fittings or wiring devices or fitting in the floor apertures it has heretofore been contemplated, pursuant to a specific instance, to compress fire-resistant discs, such as are ordinarily made of an intumescent material, between two metal plates in a sandwich structure, and to thereby squeeze the intumescent discs so as to cause them to expand radially outwardly into contact with the perimeter of an aperture wall in a concrete floor to thereby securely retain the fittings therein. Although that type of structure imparts a self-anchoring feature to the fittings, it does not facilitate orienting the wiring fittings in their appropriate angular positions so as to enable installing the wiring devices or poke-through fittings in the floor apertures without the need for cooperating electricians working on opposite building floors. Devices of that type are described, for example, in Carroll, et al. U.S. Pat. No. 4,272,643.

An anchoring structure for poke-through wiring devices or fittings of the general type considered herein is set forth in shine U.S. Pat. No. 4,323,724, in which, fastened to a fire-retarding intumescent disc assembly, a split notched, ring-shaped resilient dished spring washer has anchoring surfaces adapted be wedged against the perimeter wall surface of a concrete floor aperture so as to securely anchor in the entire poke-through wiring device or fitting therein in a predetermined angular orientation relative to the axis of the aperture. Although the fitting as elucidated in this patent publication imparts an essentially adequate self-anchoring feature to the poke-through fitting, in order to be able to remove the fitting from its installed position in the concrete floor aperture, this necessitates the entire fitting having to be forcibly pulled out, thereby practically either completely destroying or seriously damaging structural components thereof, necessitating expensive replacement thereof, in addition to entailing high labor costs in installing a new poke-through fitting.

Another structure for the anchoring of a poke-through wiring device or fitting in a concrete floor aperture is described in Spencer U.S. Pat. No. 4,496,790, wherein a pair of substantially diametrically oppositely arranged resilient clips protrude beyond the diameter of a fire retarding plate-sandwich structure of a poke-through fitting on which they are mounted by means of screw fasteners so as to contact, in a gripping manner, the perimeter of an aperture wall formed in a building floor which is constituted of a concrete material, thereby enabling the device to anchor itself in a predetermined angular orientation upon insertion therein, while facilitating removal and repositioning of the fitting through loosening of the screw fasteners and, resultingly, of the clips.

However, although the foregoing anchoring structure incorporating resilient clips improves upon the structure described in Shine U.S. Pat. No. 4,323,724 by enabling the clips to be removed through the loosening of the screw fasteners, and enabling the repositioning of the fitting subsequent to its being withdrawn from the floor aperture, the utilization of resilient clips which are of an essentially V-shaped configuration and in which the freely-flexible clip leg portion of the V-shape contacts the concrete wall fails to provide for an adequate gripping engagement with the wall of the concrete floor aperture, since the considerable flexibility and delicate nature inherent to this particular clip design does not allow for the exertion of a strong radial gripping force to be produced by this anchoring structure of the poke-through wiring device.

A poke-through connector assembly incorporating a resilient spring clip which is attached to the lower surface of a basket containing intumescent material is disclosed in Bloom U.S. Pat. No. 5,032,690, wherein the material expands to fill the aperture when the floor is subjected to fire and heat, and in which the spring clip resiliently engages the wall surface of the floor aperture through the intermediary of radially outwardly extending prong members so as to essentially anchor the poke-through fitting in the aperture. However, this resilient type of clip structure does not provide for the necessarily firm anchoring action which will inherently prevent any displacement of the fitting when the upper end thereof, which may consist of a carpet flange or the like service head structure, is subjected to rough handling.

Finally, Castellani, et al. U.S. Pat. No. 4,770,643 provides for a retaining member which is essentially of a disc-shape and is attached to the lower surface of intumescent material discs and support plate structure and which provides for circumferentially spaced prongs of a plate-like clip member of an inherently resilient nature engaging the wall surface of the floor aperture. Although this provides for an anchoring effect for the poke-through wiring fitting, there is no force of sufficient magnitude being exerted by the prongs against the wall surface of the floor aperture to securely prevent rotational or upward axial displacement of the wiring fitting.

SUMMARY OF THE INVENTION

Accordingly, it is a primary aspect of the present invention to provide a flush-type poke-through wiring fitting of the kind described herein which will incorporate a retainer clip of novel construction and material possessing unique properties for securely anchoring the fitting within a floor aperture of a concrete floor, and wherein the retainer clip is engaged between a floor cup structure and disc-shaped fire barrier inhibiting displacement of the retainer clip. This will enable the poke-through fitting or wiring device to be introduced and extended downwardly into the floor aperture to a specified extent to enable carpet to be installed on the floor surface above the aperture by employing a dished detachable installation plate fastened to the upper end of the floor cup as a template for cutting specified hole in the carpet above the floor aperture. Hereby, the installation plate is dished to provide a dimension in height which will maintain the upper end of the poke-through wiring fitting somewhat raised above the upper floor surface when pushed into the floor aperture and anchored therein by the retainer clip such that, subsequent to the installation plate having served its intended function as a template, this will enable the installation of the receptacle assembly for the wiring connectors and receptacles, and replacement of the installation plate by a carpet flange. Thereafter, the carpet flange-equipped poke-through wiring fitting can then be pushed downwardly into the floor aperture for the remaining distance in which the lower surface of the flange contacts the carpeting, so as to be firmly anchored through the retainer clip in its final installed position within the floor aperture.

Alternatively, pursuant to a modified embodiment of the present invention, in lieu of an installation plate being temporarily mounted on the floor cup during the initial insertion of the flush-type poke-through wiring fitting into the floor aperture, and thereafter causing the installation plate to be detached and replaced by a carpet flange prior to final positioning of the fitting in the floor aperture, it is contemplated that the carpet flange be mounted on the floor cup prior to the installation of the poke-through fitting, the latter of which is inserted into the floor aperture subsequent to the laying the carpet on the floor. This, in effect, eliminates the operating step of having to initially attach and thereafter detach an installation plate from the fitting, and then replacing the plate with a carpet flange.

Pursuant to a further aspect of the invention, there is provided a flush-type poke-through wiring fitting of the type described herein, in which the retainer clip comprises an annealed stainless steel plate member including upwardly and radially outwardly angled or bent prongs at opposite distal ends thereof which are adapted to firmly grip the wall structure of the floor aperture in a manner to prevent the fitting from being pulled upwardly through exerting a strong radial gripping force against the wall of the floor aperture; but which nevertheless enable the fitting to be pushed downwardly into the floor aperture under an only relatively low axial force, such as foot pressure and firmly secure the fitting within the floor aperture resistant to upward dislodgement. For this purpose, the retainer clip is constructed of an annealed stainless steel material, preferably such as type 302 or 304 annealed stainless steel possessing a minimal degree of resilience.

Yet another feature of the invention is to provide a flush-type poke-through wiring fitting of the type described herein in which a fire barrier and collar assembly of novel construction incorporates two EMT tubes fastened to a steel collar, facilitating the communication wires extending through the fitting to be enclosed with either rigid EMT conduits or with flexible metal conduits, as specified during installation of the wiring fitting.

Accordingly, it is an object of the present invention to provide a poke-through wiring device or fitting incorporating a novel, essentially non-resilient retainer clip which will enable the secure anchoring of the device within a floor aperture.

Still another object of the present invention is to provide a poke-through wiring device of the type described including a novel retainer clip which will firmly anchor the device in a floor aperture and prevent the wiring device from being displaced upwardly but allowing for downward displacement thereof within the aperture.

Yet another object of the present invention is to provide for a poke-through wiring fitting which includes a detachable installation plate attached to the upper end of a floor cup of the fitting, which plate will maintain the fitting in a somewhat elevated position above the upper floor surface about the floor aperture, with the installation plate adapted to serve as a template for laying carpeting and the like, and enabling subsequent replacement of the installation plate by a carpet flange facilitating further downward displacement of the poke-through wiring device into the floor aperture into its final installed and secured position.

BRIEF DESCRIPTION OF THE DRAWINGS

The foregoing objects, features and further advantages of the invention may now be more readily ascertained from the following detailed description of a preferred embodiment of a flush-type, poke-through wiring device, taken in conjunction with the accompanying drawings; in which.

DETAILED DESCRIPTION

Figure 1:
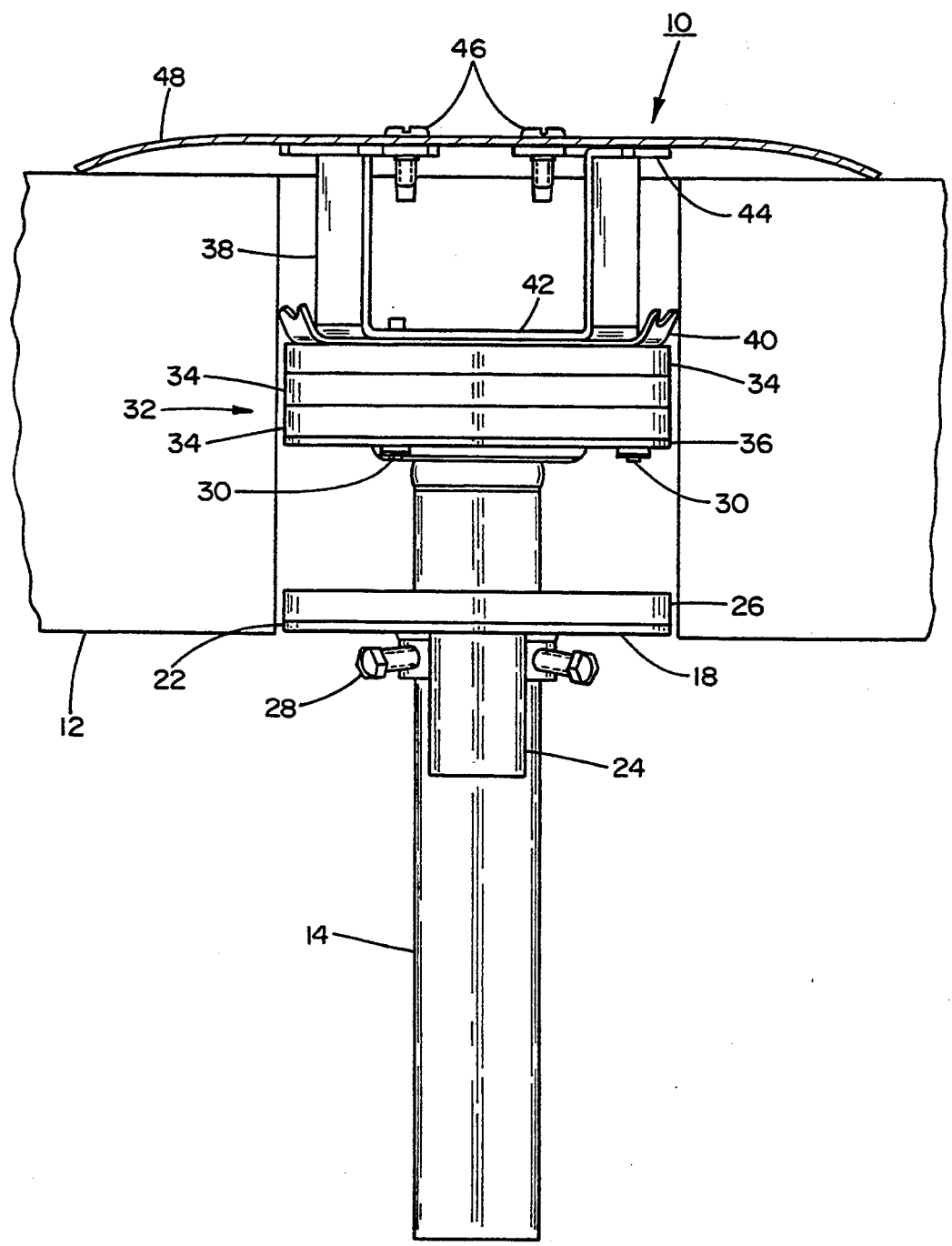
FIG. 1 illustrates an elevational sectional view through a poke-through wiring device or fitting incorporating the inventive retainer clip and an installation plate constructed pursuant to the invention.
Figure 4:
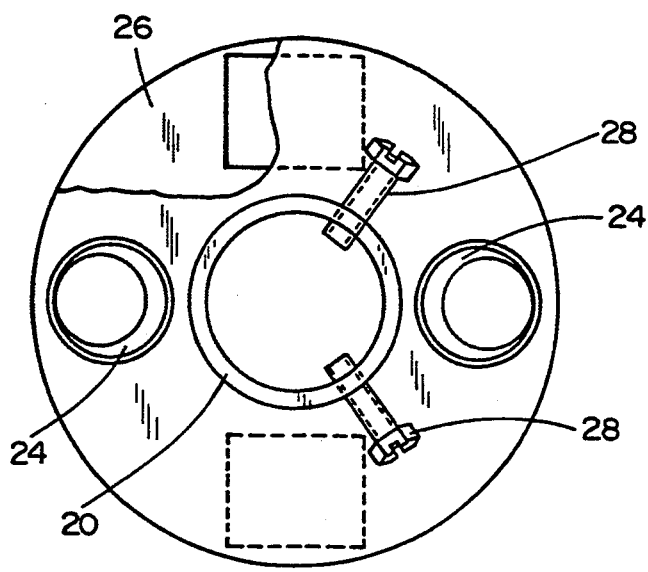
FIG. 4 illustrates a bottom view of the collar structure of FIG. 2.
Figure 5:
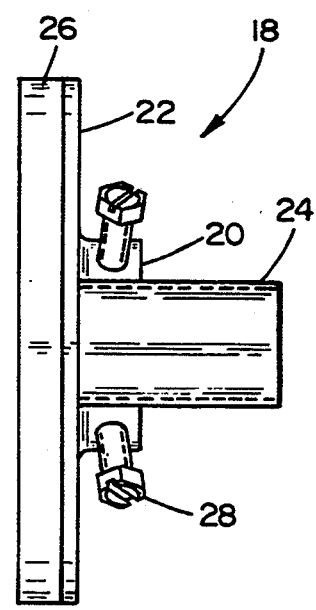
FIG. 5 illustrates a side view of the collar structure showing an intumescent-material disc attached thereto.
Figure 6:
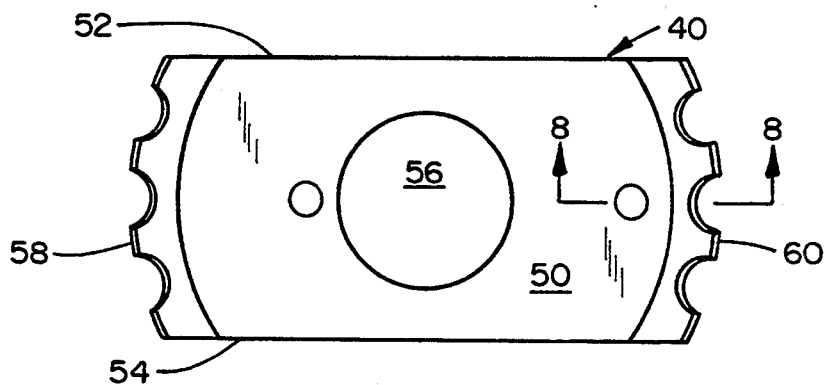
FIG. 6 illustrates a plan view of a retainer clip for the wiring device.
Figure 7:
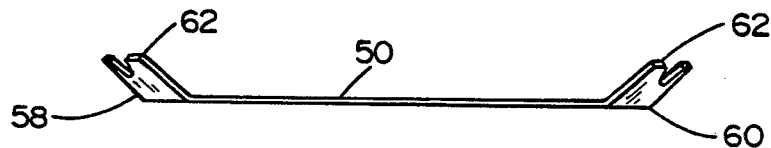
FIG. 7 illustrates a side view of the retainer clip.

Referring now in more particular detail to the drawings, and specifically to FIG. 1, there is disclosed a flush-type poke-through wiring fitting 10 which is mountable so as to extend through a floor aperture 12 formed in a concrete floor of a building structure, as is well known in the technology. Generally, the floor aperture 12 is of a smooth-walled cylindrical configuration, for instance, a 3-inch diameter core-drilled hole, and is adapted to receive the therewith coaxially arranged tubular channel 14 of the wiring fitting 10 for conducting the respective insulated electrical wiring and signal lines for electrical power transmission and telecommunications equipment extending from one floor space to a superimposed upper floor space of the building structure. Hereby, the channel 14 may be constituted from metallic tubing or a conduit and the like, as is known in the building construction technology. Arranged on the tubing 14 is a fire barrier and collar assembly 18, described in further detail hereinbelow with references to FIGS. 2 through 5, and wherein the assembly 18 essentially consists of a metallic collar structure 20 and flange 22 having EMT tubes 24 fastened thereto so as to enable the communication wires to be enclosed by either rigid EMT conduits or flexible metal conduits (not shown) when specified for installation purposes. Superimposed on and fastened to the collar assembly 18 is a fire-barrier disc member 24 constituted from an intumescent material. The entire arrangement 18 may be clamped to the tube 14 by means of suitable screw fasteners 28, as shown in FIGS. 4 and 5, which engage threaded holes in collar structure 20.

At the upper end of the tubular channel 14, the latter is connected through the intermediary of suitable screw-type fasteners 30 to a fire barrier structure 32 which, as illustrated by way of example, may consist of a plurality (in this instance three) of superimposed intumescent-material disc members 34 which are sandwiched between a lower metallic support plate 36 and a floor cup 38, with the inventive retainer clip 40 being positioned sandwiched between the uppermost disc member 34 and floor cup 38. The retainer clip 40 embodying an aspect of the inventive concept, is fastened between the uppermost intumescent-material disc 34 and the floor cup 38 through the intermediary of the plurality of fastening screws 30 which extend from beneath the support plate 36 through the intumescent-material disc members 34 and the retainer clip 40, and engage cooperating threaded apertures in a bottom plate 42 of the floor cup 38.

The upper end of the floor cup 38 is equipped with horizontal flanges 44 which are adapted to have fastened thereto, by means of suitable screw fasteners 46, either a dished installation plate 48 or, alternatively, a carpet flange (not shown), as discussed in more specific detail further on hereinbelow.

In essence, the inventive retainer clip 40, as shown in more specific detail in FIGS. 6 through 9 of the drawings, consists of a plate member 50 of predetermined width having parallel sides 52, 54 and including a central aperture 56 to enable the passage therethrough of the various electrical conduits and wires. The retainer clip 40 has opposite curvilinear ends 58, 60 of diametrical dimensions generally ¼ inch or more larger than that of the floor aperture 12. The diametrically opposite ends 58, 60 of the retainer clip 40 each incorporate a plurality of prongs 62 arranged adjacent generally arcuate or semi-circular cutouts 64, and with radially outer end portions of the clip ends 58, 60 each being bent upwardly, as shown in the drawings, preferably at approximately an angle of about 45°±5° relative to the extent of the flat central plate section 50 of the retainer clip 40.

Figures 8, 9:
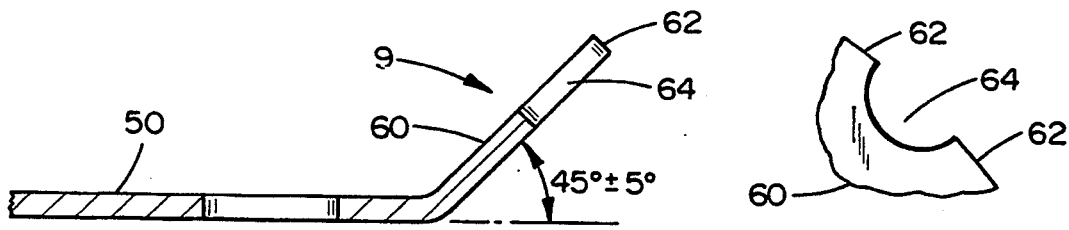
FIG. 8 illustrates, on an enlarged scale, a sectional view taken along line 8 - 8 in FIG. 6.
FIG. 9 illustrates a fragmentary view taken in the direction of arrow 9 in FIG. 8.

The retainer clip 40 is produced from an essentially non-resilient annealed Type 302 or 304 stainless steel, possessing unique and advantageous mechanical properties. Hereby, the upwardly bent end portions 58, 60 possessing the radially outwardly and upwardly projecting prongs 62 are produced by being stamped and formed into shape without any spring-back, whereas when the 45° bends are produced, as shown in FIG. 8, through cold working of the stainless steel in this region this results in imparting a considerably higher tensile and yield strength to the steel.

This treatment of the retainer clip material enables the prongs 62 to be upwardly deflected (as shown in FIG. 1) during contacting of the concrete wall surface of floor aperture 12 during the downward inserting movement of the wiring fitting 10 into the floor aperture, while concurrently causing extremely high lateral or radial forces to be exerted by the prongs 62 against the concrete wall of the floor aperture, generally in a magnitude of several thousands of pounds, thereby inhibiting the wiring fitting 10 from being upwardly dislodged and concurrently restricting any rotational movement thereof within the floor aperture 12. Nevertheless, due to the extremely low frictional resistance between the prongs 62 of the retainer clip 40 and the surface of-the smooth-core drilled concrete hole, the poke-through wiring fitting 10 only necessitates the application of a light foot pressure thereon by an installer to be able to push the fitting downwardly through the floor aperture 12 into its intended position.

Figure 2:
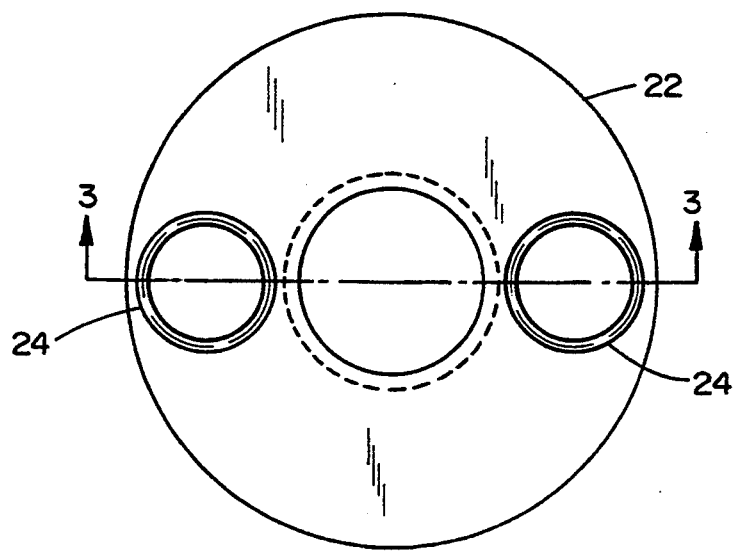
FIG. 2 illustrates a top plan view of a collar structure for mounting EMT tubes utilized in conjunction with the wiring device.
Figure 3:
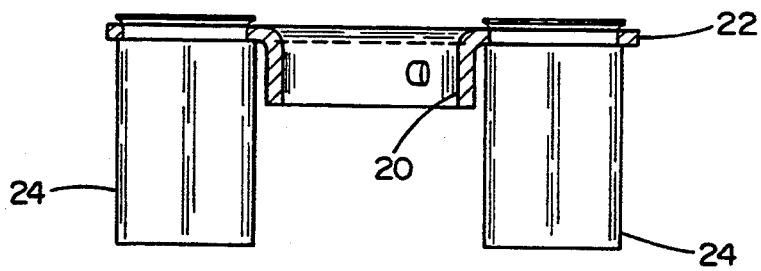
FIG. 3 illustrates a sectional view taken along line 3—3 in FIG. 2.

In essence, the installation of the assembled wiring fitting 10, as shown in FIGS. 1 and 2, only requires a single worker or installer operating from the upper floor to push the poke-through wiring fitting 10 downwardly into the floor aperture 12; and when equipped with the dished installation plate 48, will permit the wiring fitting to be inserted into the floor aperture until the installation plate 48 has its lower edge contact the surface of the building floor above the floor aperture. This enables the installation plate 48 to be employed as a template for cutting a suitable opening in carpeting being laid on the floor about the floor aperture. Thereafter, the installation plate 48 is detached from the floor cup 38 of the wiring fitting 10 through the removal of the screw fasteners 46 attaching the installation plate 48 to the flange 44 of floor cup 38, and replacement of the installation plate by a suitable carpet flange, as is known in the technology. Subsequently, upon attachment of the carpet flange (not shown) and effecting the necessary wiring connections and the like procedures, the installer need merely apply downward foot pressure to the carpet flange to move the wiring fitting 10 further downwardly and firmly seat the fitting in the floor aperture in a flush-type installation in which the lower surface of the carpet flange is flush positioned on the installed floor carpeting.

Alternatively, pursuant to a modification of the above-described embodiment, instead of employing an installation plate 48 which is temporarily mounted on the floor cup 38, it is possible to initially mount a carpet flange on the poke-through wiring fitting 10 prior to installation of the latter in the floor aperture 12, especially in instances where carpeting, wood flooring or tile has already been laid or installed on the floor, or the latter has been suitably finished, and appropriate cutouts have been previously formed therein about the floor aperture 12. This eliminates the installation step of the previous embodiment of having to initially mount and thereafter detach an installation plate 48, and to subsequently attach a carpet flange to the floor cup 38 of the wiring fitting 10, and then push the fitting further into the floor aperture into its final installed position. For the remainder, the procedure in the installation of the wiring fitting 10 is identical with that of the preceding embodiment.

Figure 10:
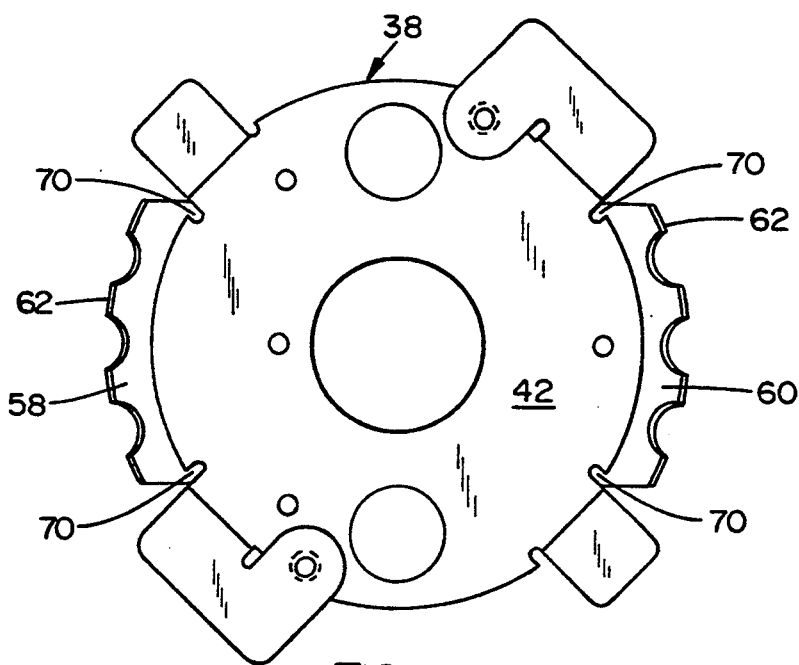
FIG. 10 illustrates a top plan view of the bottom plate of a floor cup of the wiring device, showing the retainer clip positioned therebeneath.

The clamping of the retainer clip 40 between the uppermost intumescent-material disc member 34 of the fire barrier structure and the bottom plate 42 of the floor cup 38, as shown in FIG. 10, whereby the floor cup 38 is equipped with position-defining notches 70 for orienting the retainer clip 40 therebetween, also ensures that the wiring fitting 10 will be inserted in a correct rotational position within the floor aperture 12, and whereby the frictional engagement of the prongs 62 with the concrete wall surface of the floor aperture, although permitting downward axial displacement of the wiring fitting responsive to downward foot pressure being exerted thereagainst by an installer, will inhibit rotation of the wiring fitting or upward dislodgement thereof within the floor aperture so as to cause the fitting to be firmly anchored in place in its final installed condition in the floor aperture.

The foregoing structure not only ensures a simple and firmly anchored installation of the flush-type poke-through wiring fitting 10, possessing the superior anchoring qualities of the non-resilient, stainless steel retainer clip 40 in comparison to those currently being employed in the technology, but also eliminates the need for a toggle assembly which has heretofore been widely employed in conjunction with such kinds of wiring fittings, and the latter of which necessitate the anchoring of the wiring fitting in the floor aperture by two cooperatively working installers, one working from above and one from below the floor aperture. Moreover, the elimination of the toggle assembly also reduces the number of components and thereby renders the entire wiring fitting not only more economical on the basis of a simpler installation, but also from the viewpoint of its manufacturing costs. 1 While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A self-anchoring poke-through wiring device for insertion into a passage extending through a concrete floor aperture of a building structure to facilitate transmission of electrical power and telecommunication signals between a service head and a junction box located at opposite sides of the floor; said wiring device comprising a cover plate structure positionable above the upper face of said floor so as to cover the floor aperture; channel means extending through said floor aperture for conducting insulated wires and telecommunication signals through said floor aperture between said junction box and said service head; fire retarding structure being fixedly connected to at least the upper end of said channel means for sealing the aperture in response to encountered heat and fire to form a fire barrier in said floor aperture; a floor cup for the receipt of electrical connectors extending between said fire retarding structure and said cover plate structure, said floor cup having a disc-shaped base fastened to said fire retarding structure and upstanding leg portions extending from said base having free distal ends fastenable to said cover plate structure; and generally rigid non-resilient metallic retainer clip means being interposed between said floor cup and said fire retarding structure, said retainer clip means including diametrically opposite end portions frictionally engageable with the wall surface of said floor aperture for securely anchoring said wiring device in said floor aperture against rotational movement and upward displacement while enabling downwardly displacement of the fitting, outer end portions of the retainer clip means having prongs formed thereon for engaging the wall surface of the floor aperture in frictional contact, said outer end portions of the retainer clip means each being bent upwardly at an angle of between about 40° to 50° relative to the plane of a flat center portion of said clip means, said retainer clip means being constituted of a corrosion-resistant annealed stainless steel having cold-worked portions in at least the bent portions of said retainer clip means.

2. A poke-through wiring device as claimed in claim 1, wherein said retainer clip means comprises a central flat plate member, the opposite outer end portions of said plate member frictionally engaging the wall structure of the floor aperture being each angled upwardly so as to inhibit upward dislodgement of said wiring device within the floor aperture.

3. A poke-through wiring device as claimed in claim 2, wherein said outer end portions of the retainer clip means are arcuately configured in conformance with the diametral curvature of the wall structure of the floor aperture.

4. A poke-through wiring device as claimed in claim 1, wherein said retainer clip means facilitates positioning of said wiring device in interior vertical positions within the floor aperture and subsequent downward displacement of the device into the final installed position thereof in the floor aperture.

5. A poke-through wiring device as claimed in claim 1, wherein said cover plate structure comprises a dished installation plate detachably fastened to the upper end of said floor cup.

6. A poke-through wiring device as claimed in claim 5, wherein said installation plate is replaceable by a carpet flange.

7. A poke-through wiring device as claimed in claim 5, wherein said installation plate comprises a template for the installation of carpeting on the floor about the floor aperture.

8. A poke-through wiring device as claimed in claim 1, wherein said cover plate structure comprises a carpet flange.

9. A poke-through wiring device as claimed in claim 1, wherein said fire retarding structure comprises disc means consisting of an intumescent material, said retainer means being fastened intermediate said disc means and the base of said cup member.

10. A poke-through wiring device as claimed in claim 1, wherein a collar structure is mounted on said device below the fire retarding structure, said collar structure including means for attaching EMT tubes.

11. A poke-through wiring device as claimed in claim 10, wherein said collar structure includes a collar member and a flange integrally formed therewith, said collar member including fastener means for attaching said collar structure to said wiring device; and fire-barrier means being positionable on said flange.

* * * * *